UNITED STATES PATENT OFFICE.

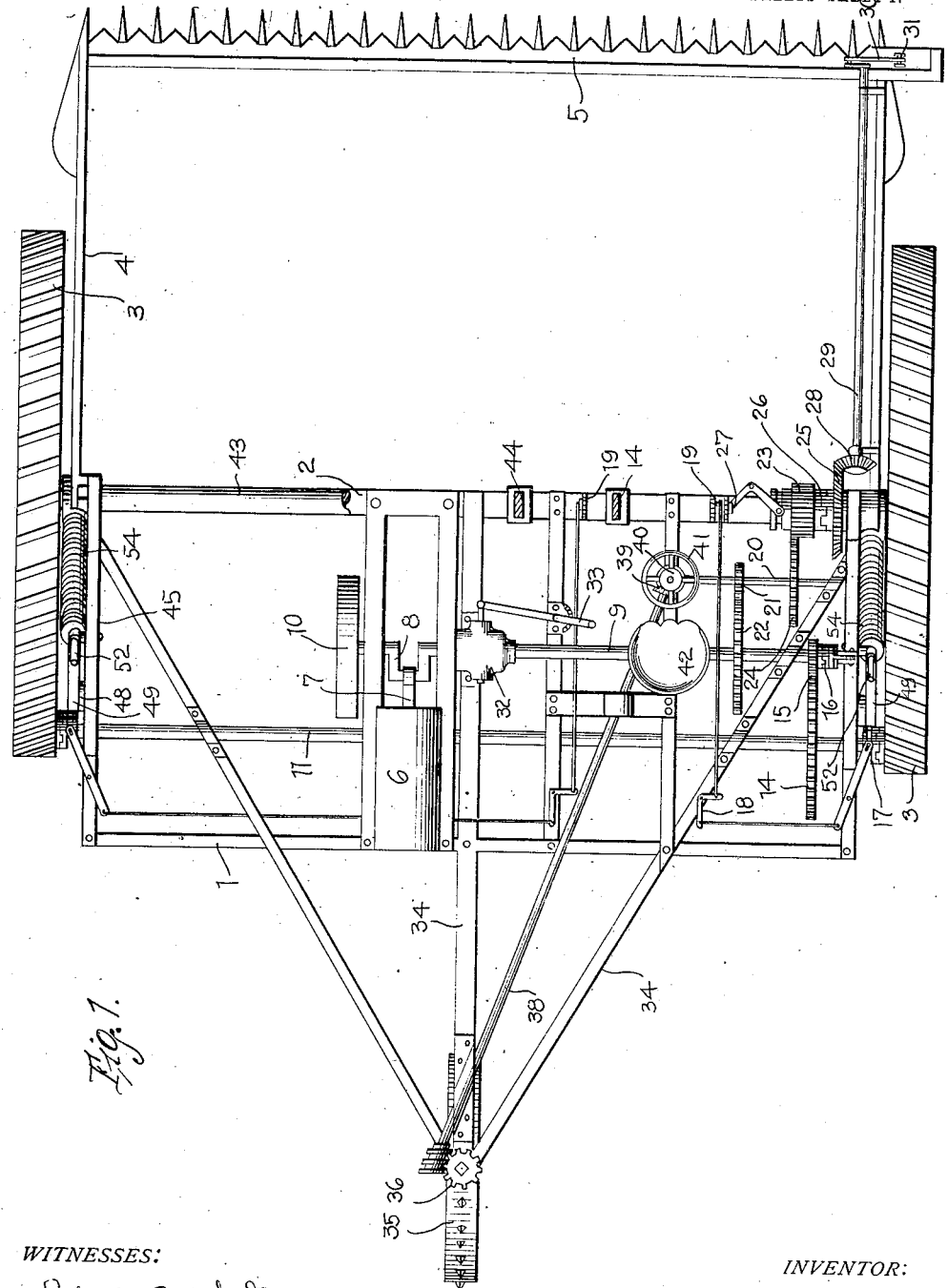

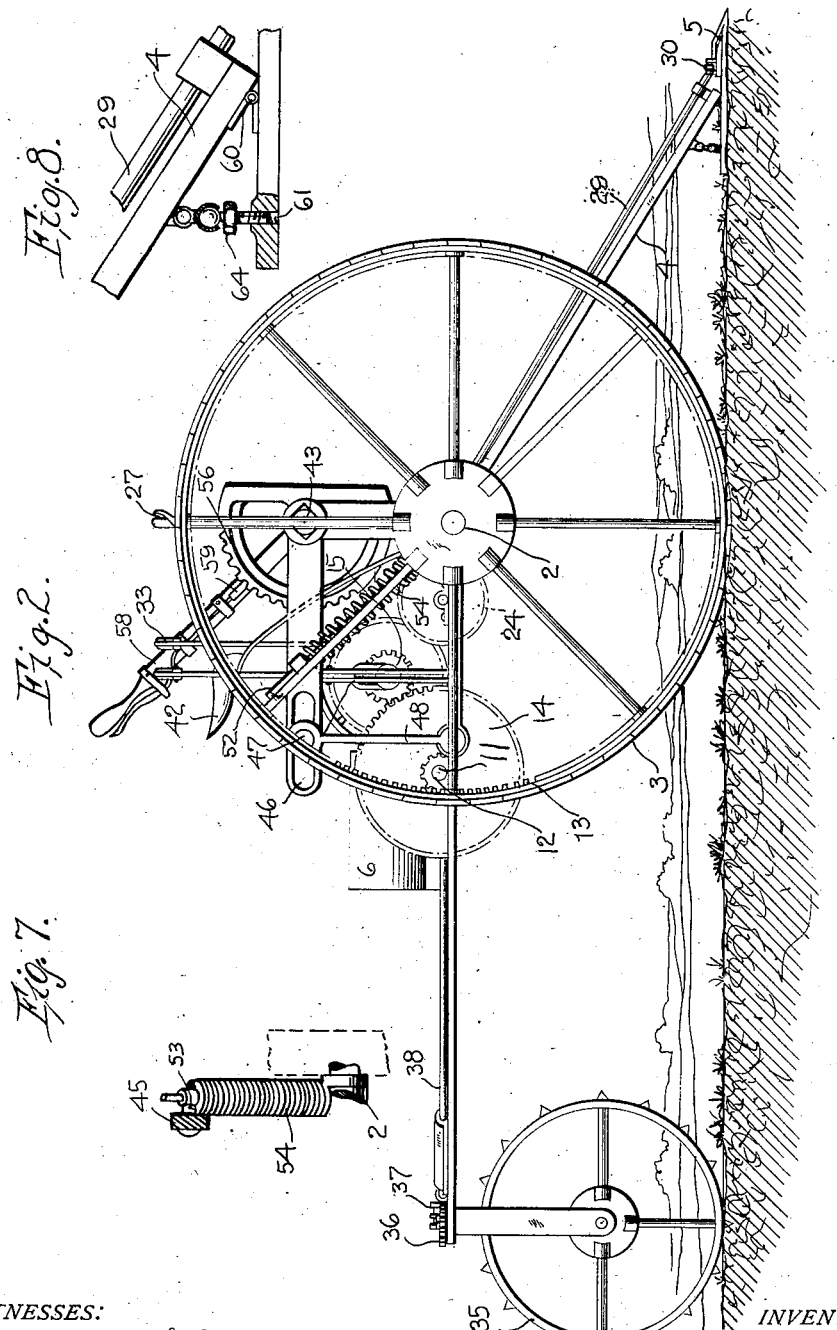

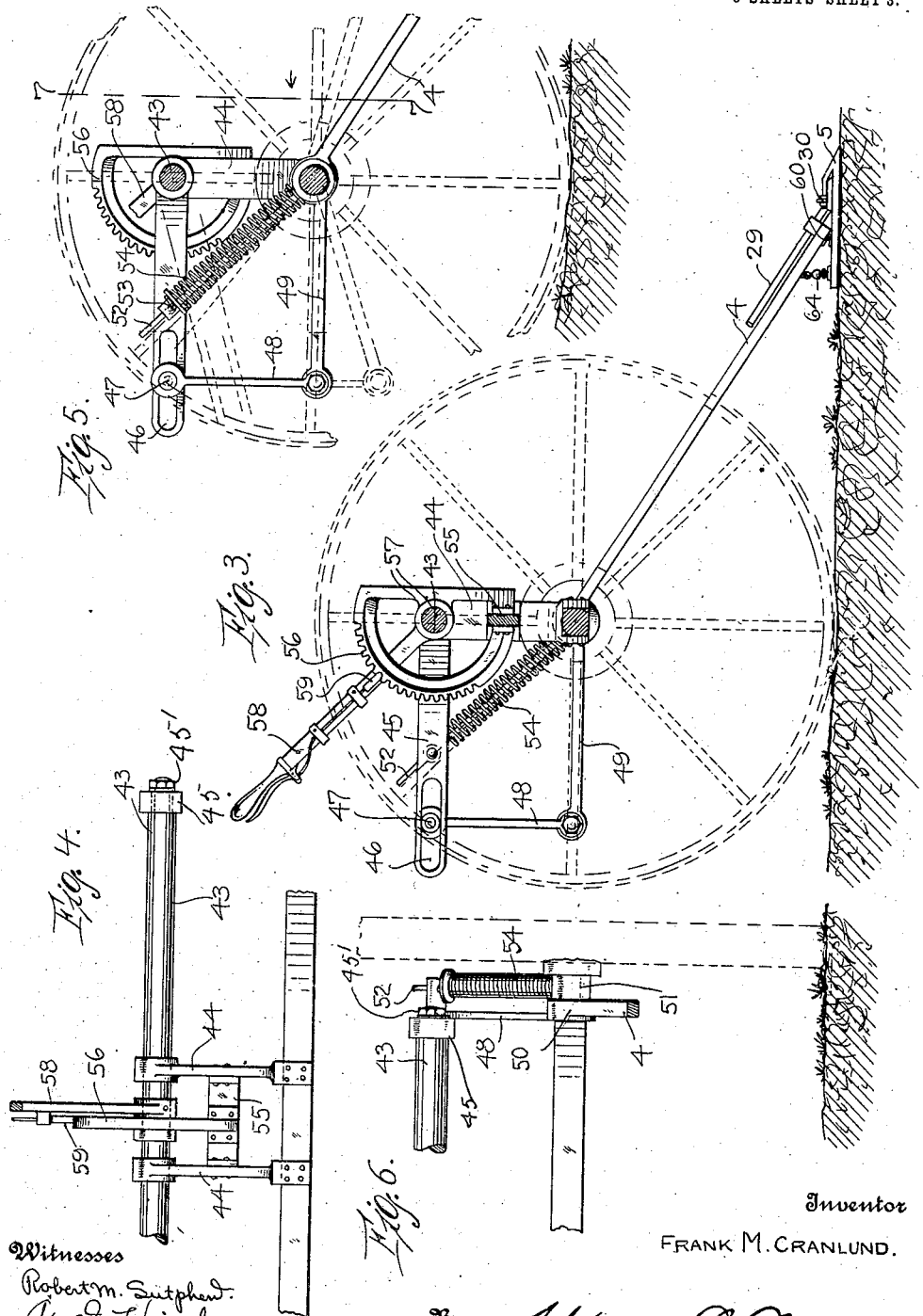

FRANK M. CRANLUND, OF CROMWELL, MINNESOTA.

MOWING-MACHINE.

1,084,134.  Specification of Letters Patent.  Patented Jan. 13, 1914.

Application filed November 16, 1912. Serial No. 731,846.

*To all whom it may concern:*

Be it known that I, FRANK M. CRANLUND, a citizen of the United States, residing at Cromwell, in the county of Carlton and State of Minnesota, have invented certain new and useful Improvements in Mowing-Machines, of which the following is a specification, reference being had to the accompanying drawings.

This invention relates to new and useful improvements in farm implements and more particularly to a mowing machine or harvester, the object of the invention being to provide an arrangement whereby the mower bar or cutter is driven entirely independent of the advance of the implement.

A further object is to provide means for throwing the driving mechanism of the cutter bar out of operation so as to prevent injury to the teeth of the cutter when obstructions such as stones or the like become caught in the teeth.

Another object of the invention is to provide an implement of the above character which will possess advantages in points of efficiency and durability, is inexpensive of manufacture and at the same time is simple in construction and operation.

With the above and other objects in view, this invention consists in the novel details of construction, combination and arrangement of parts as will be hereinafter more fully described and shown in the accompanying drawings, in which—

Figure 1 is a top plan view of a harvester constructed in accordance with my invention. Fig. 2 is a side elevation. Fig. 3 is a side elevation illustrating my improved means for raising and lowering the cutter bar. Fig. 4 is a front elevation of the same. Fig. 5 is a side elevation taken from the opposite side to that shown in Fig. 3. Fig. 6 is a sectional view taken on the line 6—6 of Fig. 5. Fig. 7 is a detail perspective view of the coil spring which helps to reduce the weight from the cutter bar, and Fig. 8 is a detail view, parts being broken away and in section illustrating means for tilting the cutter bar.

Referring more particularly to the drawings, 1 indicates the framework of the machine which is suitably mounted upon an axle 2 upon the ends of which are mounted the traction wheels 3. Suitably supported by means of the bars 4 is the cutter bar 5 which is arranged directly in advance of the axle 2 and it will be understood that there is to be sufficient space between the cutter bar and the axle to allow the cut grain to fall to the ground after being cut without engaging any of the mechanism carried by the frame.

Mounted upon the frame 1 and arranged upon one side thereof at the rear of the axle 2 is a motor 6, by means of which the cutter bar 5 is operated and the traction wheels 3 are also operated to control the advance of the implement. The piston 7 of the motor is suitably connected to a crank 8 formed upon the longitudinal shaft 9 upon one end of which is mounted a fly wheel 10. Arranged in parallel relation with the shaft 9 and disposed at the rear thereof is the traction shaft 11 upon the outer ends of which are mounted the gears 12 which are adapted to mesh with the teeth 13 formed upon the inner periphery of the wheels 3. The shaft 11 is rotated through the medium of the gear 14 which meshes with the gear 15 mounted upon the main shaft 9, the rotation of the gear 14 being controlled through the medium of the clutch member 16. Mounted upon the shaft 11 and arranged adjacent the gears 12 are the clutch members 17 which are operated by means of the bell cranks 18 and the levers 19. The gears 12 are to be rotated through the engagement of the clutch members 18 so that by the operation of the levers 19 the traction wheels may be rotated or retained stationary.

Arranged in parallel relation with the shaft 9 and disposed in front thereof, is a stub shaft 20 which is suitably connected to the shaft 9 by means of the gears 21 and 22. Mounted upon the shaft 20 and adapted to engage a gear 23, which is loosely mounted upon the axle 2, is a gear 24. The gear 23 is adapted to impart motion to a beveled gear 25, which is mounted upon the axle 2, by means of the clutch member 26, said clutch member being manipulated by means of the lever 27. The beveled gear 25 is adapted to mesh with a similar gear 28 mounted upon the inner end of the shaft 29. Pivotally secured to the outer end of the shaft 29 is a pitman 30 which is suitably connected to the cutter bar as shown at 31 and adapted to reciprocate the same upon the rotation of the shaft 29. Arranged upon the main shaft 9 is a reverse clutch 32 which is operated by means of the lever 33 so that the machine may be quickly backed away from an object with which the cutter bar has come in contact.

Supported at the rear of the frame 1 by means of the brace members 34 is a steering wheel 35 which is manipulated by means of the gear 36 adapted to mesh with the worm 37 upon the rear end of the operating shaft 38. Secured to the forward end of the shaft 38 is a beveled gear 39 which is adapted to mesh with a similar gear mounted upon the lower end of the steering shaft 40. The steering shaft 40 is operated by means of a hand wheel 41 mounted upon the upper end thereof and arranged in front of the operator's seat so that the advance of the machine can be readily controlled by the operator.

Arranged above the axle 2 and in spaced relation therewith is a shaft 43 which is suitably supported by means of the bearing members 44. Rigidly secured to the shaft 43 and arranged adjacent each end thereof are the rearwardly extending arms 45 which are provided at their rear ends with the elongated slots 46 which are adapted to receive the pins 47. Nuts 45' are threaded upon the ends of the pins opposite the ends of the links 48 to securely hold said pins in position. Connecting links 48 are provided having one of their ends secured to the pins 47 and their other ends pivotally secured to the rear end of the extensions 49 which are formed integral with the bars 4. Mounted upon the axle 2 and arranged between the bearings 50 of the bars 4 and the extensions 49 are the collars 51 in which are mounted the lower ends of the guide rods 52, the upper ends of said guide rods being loosely mounted within the brackets 53 carried by the arms 45. Mounted upon the rods 52 and having one of their ends secured to the brackets 53 and their other ends secured to the collars 51 are the coil tension springs 54 which are adapted to reduce the weight from the cutter bar when the same is in its lowered or operative position.

Mounted upon the cross piece 55 is a rack bar 56, said rack bar being provided with a central bearing 57 in which the shaft 43 is mounted. Mounted upon the shaft 43 and arranged adjacent the rack bar 56 is a lever 58 carrying the spring pressed pawl 59 which is adapted to engage with the teeth on the rack to hold the lever in various adjusted positions, the adjustment of said lever raising and lowering the cutter bar 5. In raising the cutter bar, the lever is pushed downwardly, actuating the arms 45 and pressing downwardly upon the rear ends of the extensions 49, this action removing the tension from the springs 54 so that when the cutter bar is lowered, the springs will be placed under tension and help reduce the weight of the cutter bar so that the same may be easily lowered.

In Fig. 8, I have shown a novel means for adjusting the cut of the bar 5 so that the same will either cut close to the ground or be raised therefrom. In this form, I have hingedly secured the cutter bar at the lower end of the bars 4 as shown at 60 and the rear edge of the cutter bar is provided with the threaded openings 61, the bars 4 are also provided with a threaded opening 62. Arranged between the bars 4 and the cutter bar 5 is a vertically disposed threaded rod 63, the ends of which are engaged within the threaded openings 61 and 62 so that when the rod is rotated, by means of the nut 64 upon the intermediate portion thereof, the outer edge of the cutter bar will be tilted toward or away from the ground.

From the above description taken in connection with the accompanying drawings, it will be readily apparent that the machine can be quickly and easily moved from place to place without operating the cutter bar and it will also be seen that the cutter bar can be driven entirely independent of the advancement of the machine. It will also be apparent that the operating mechanism of the cutter bar can be quickly and easily thrown out of operation to prevent injury to the teeth of the cutter bar when obstructions such as stones and the like are caught therein. It will also be seen that I have provided novel mechanism whereby the cutter bar may be raised entirely free from the ground when the machine is being moved from place to place so that the same will not come in contact with the uneven surface of the ground.

While I have shown and described the preferred form of my invention, it will be obvious that various changes in the details of construction and in the proportions may be resorted to for successfully carrying my invention into practice without sacrificing any of the novel features or departing from the scope of the appended claims.

What I claim is:—

1. In a mowing machine, the combination of a traction axle having a traction wheel upon each end thereof, bars having one end mounted upon said axle adjacent each end and extending forwardly therefrom, a cutter bar carried by the outer end of said bars and arranged in spaced relation with the axle, extensions formed upon said bars and projecting rearwardly, a shaft mounted upon the axle and arranged in spaced relation therewith, an arm mounted upon each end of said shaft, links pivotally connecting said arms with the extensions on the bars, collars mounted upon the axle adjacent each end thereof, means for raising said cutter bar and coil springs acting against said arms for returning the cutter bar to its operative position.

2. In a mowing machine, the combination with a traction axle, bars having one end mounted upon said axle adjacent each end and extending forwardly therefrom, a cutter bar carried by the outer ends of said bars, extensions formed on said bars and projecting rearwardly from the axle, a shaft mounted above said axle and arranged in spaced relation therewith, an arm projecting rearwardly from each end of said shaft, said arms having slots in their rear ends, pins movably mounted within said openings, links connecting said pins and the rear ends of the extensions, and means for rotating said shafts to raise and lower the cutter bar.

3. In a mowing machine, the combination with a traction axle, bars having one end mounted upon said axle adjacent each end and extending forwardly therefrom, a cutter bar carried by the outer ends of said bars, extensions formed on said bars and projecting rearwardly from the axle, a shaft mounted above said axle and arranged in spaced relation therewith, an arm projecting rearwardly from each end of said shaft, said arms having slots in their rear ends, pins movably mounted in said openings, links connecting said pins and the rear ends of the extensions, collars mounted upon the axle adjacent each end thereof, means for raising said cutter bar and coil springs acting against said arms for returning the cutter bar to its operative position.

In testimony whereof I hereunto affix my signature in the presence of two witnesses.

FRANK M. CRANLUND.

Witnesses:
  IDA E. MORSE,
  WILLAJA SARELA.